Feb. 19, 1963 R. C. BERRY 3,078,435
DEAD-FRONT ELECTRICAL RECEPTACLE
Original Filed May 19, 1958 5 Sheets-Sheet 1
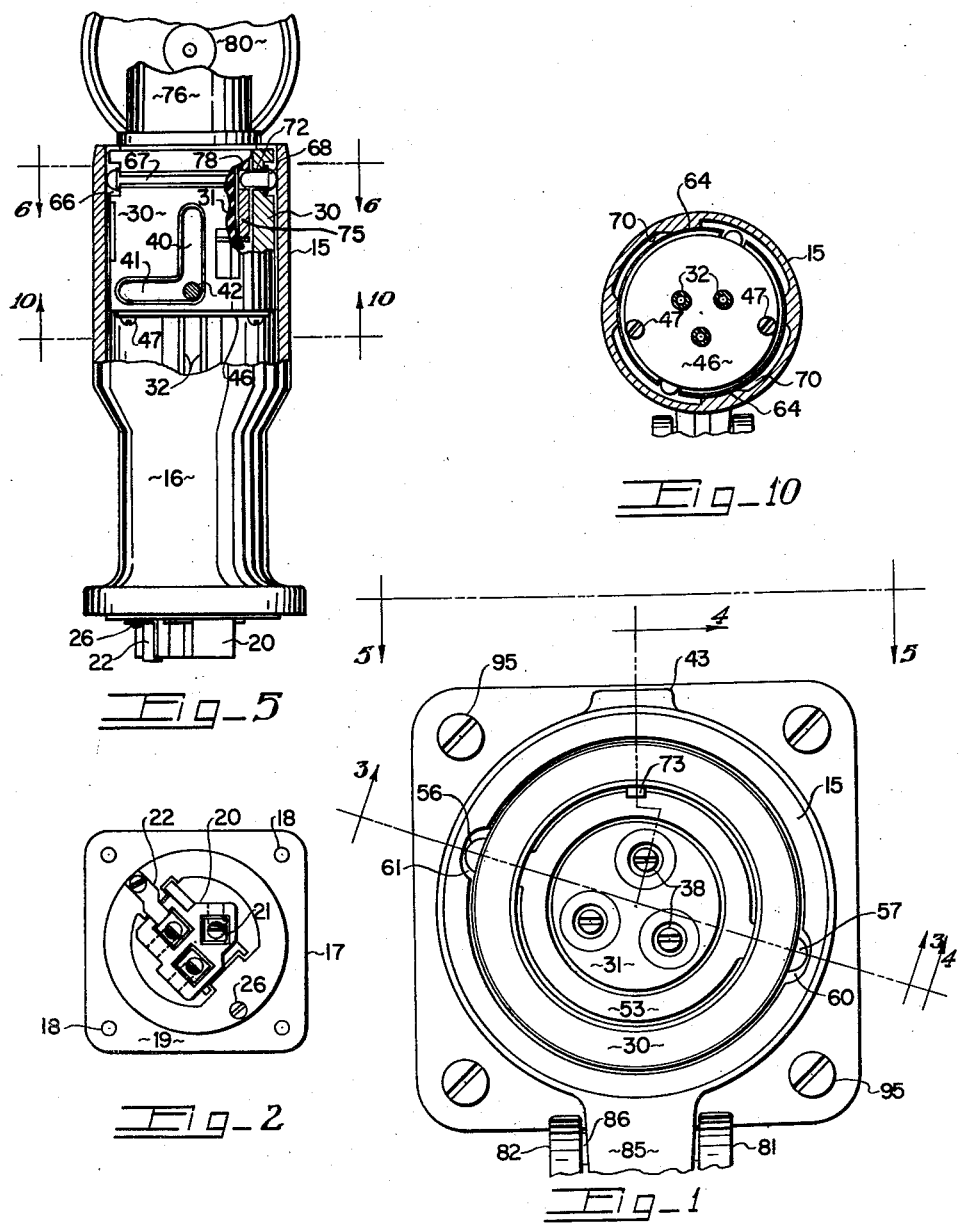
INVENTOR.
Richard C. Berry
BY L. Emmett Thompson
ATTORNEY

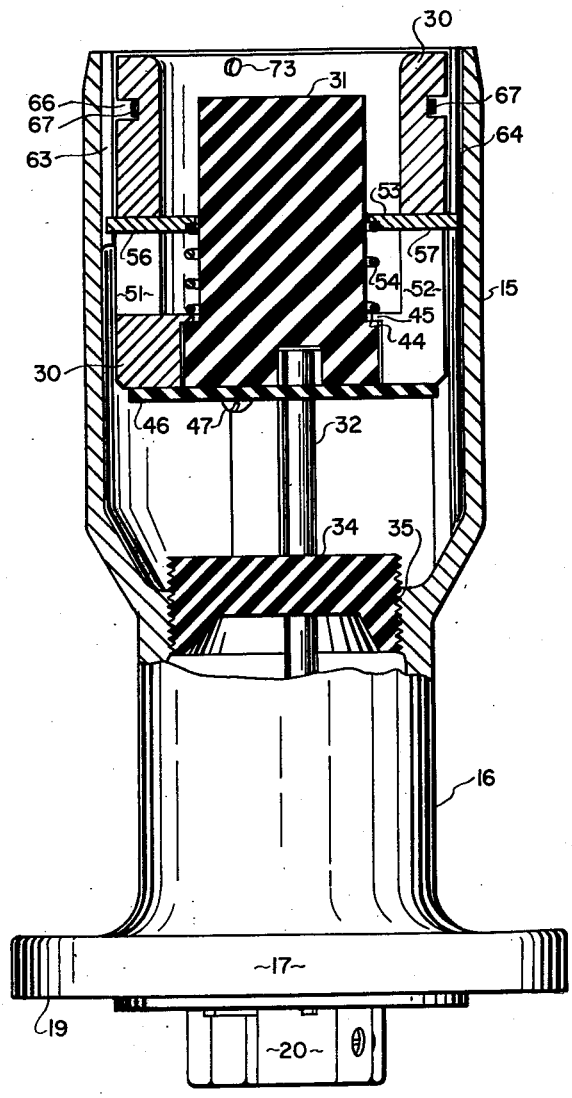

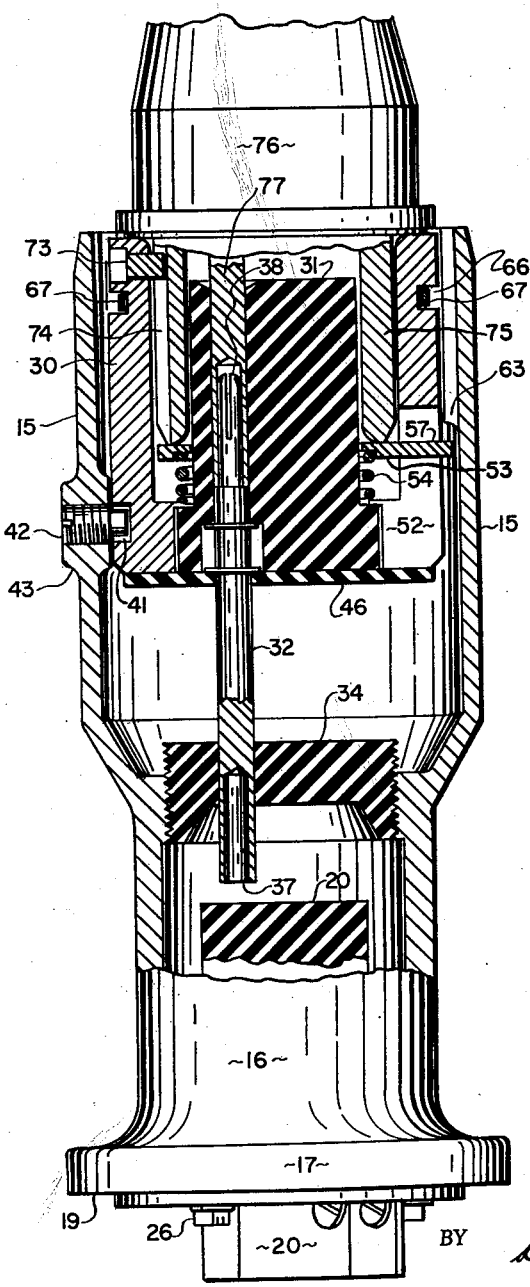

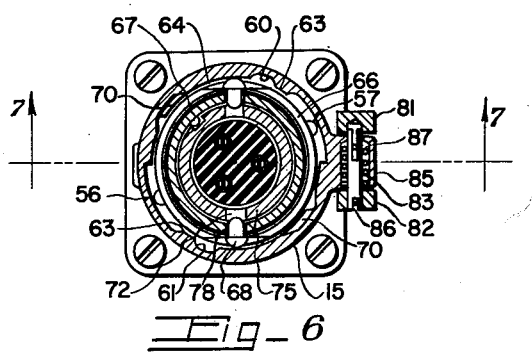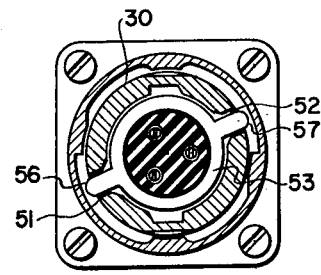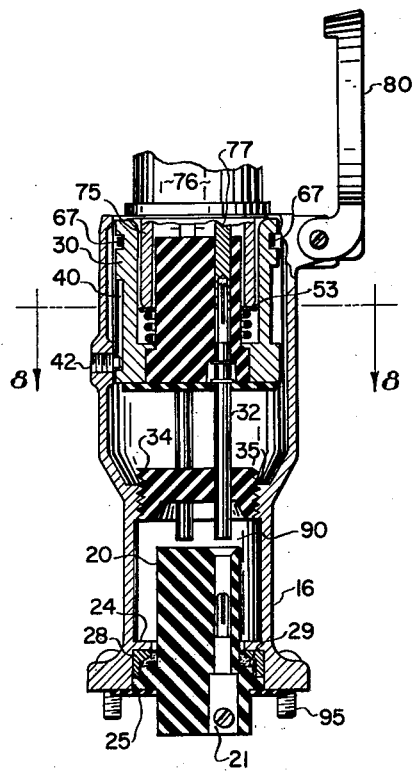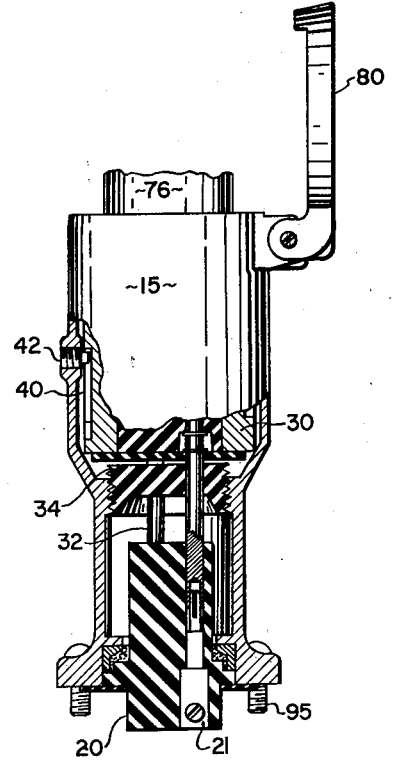

Feb. 19, 1963  R. C. BERRY  3,078,435
DEAD-FRONT ELECTRICAL RECEPTACLE
Original Filed May 19, 1958  5 Sheets-Sheet 5
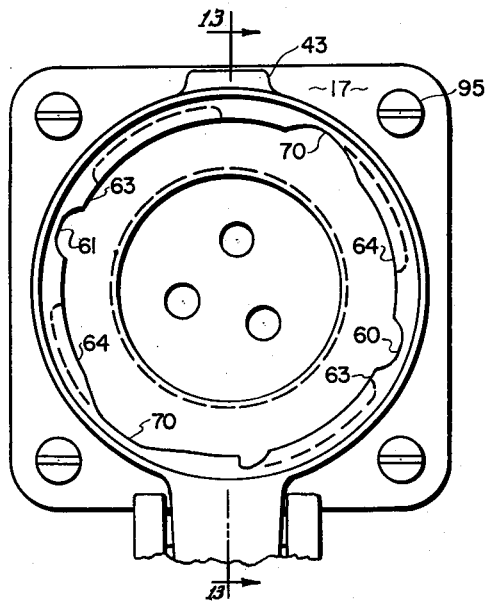
Fig_11
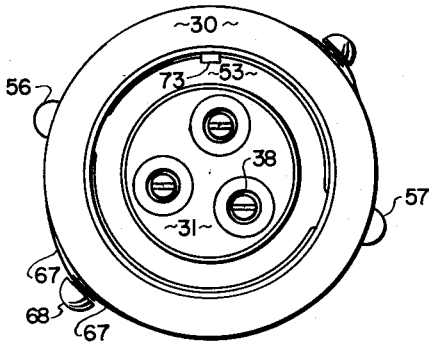
Fig_12
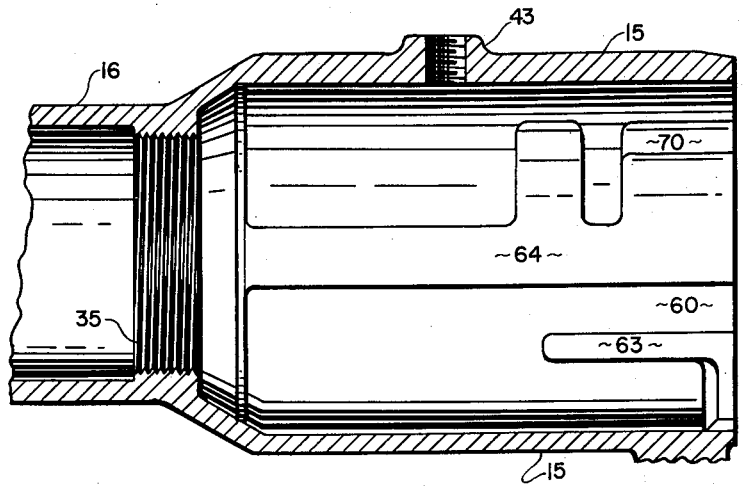
Fig_13
INVENTOR.
Richard C. Berry
BY D. Emmett Thompson
ATTORNEY

United States Patent Office 3,078,435
Patented Feb. 19, 1963

3,078,435
DEAD-FRONT ELECTRICAL RECEPTACLE
Richard C. Berry, Camillus, N.Y., assignor to Crouse-Hinds Company, Syracuse, N.Y., a corporation of New York
Continuation of application Ser. No. 736,229, May 19, 1958. This application June 8, 1961, Ser. No. 116,921
5 Claims. (Cl. 339—111)

This invention relates to an electrical connecting unit of the receptacle type to be used in industrial locations where combustible dusts are present in the atmosphere surrounding the connecting unit. In such locations, it is necessary that electrical connection through the receptacle be broken in a chamber which is sealed off from the dust filled atmosphere in order that any arcing caused by the electrical disconnection will be contained within the chamber so as to prevent any explosion.

Therefore, it is an object of this invention to provide an electrical connecting unit wherein contact is made and broken within a dust excluding chamber in the unit.

It is a further object of this invention to provide an electrical connecting unit wherein the exposed electrical contacts have been disconnected to render them dead or harmless when the plug is disconnected from the receptacle so as to prevent any accidental shock from occurring.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is an enlarged top plan view of the receptacle.

FIGURE 2 is a bottom plan view of the receptacle.

FIGURE 3 is an enlarged partial cross sectional view taken on line 3—3 of FIGURE 1.

FIGURE 4 is an enlarged partial cross sectional view taken on line 4—4 of FIGURE 1, showing a plug inserted in the receptacle.

FIGURE 5 is a side elevational view of the receptacle taken looking in the direction of the arrows of line 5—5 of FIGURE 1, with parts broken away and parts in section.

FIGURE 6 is a cross sectional view taken on line 6—6 of FIGURE 5.

FIGURE 7 is a cross sectional view taken on line 7—7 of FIGURE 6, showing the receptacle contacts aligned with but out of engagement with the terminal contacts.

FIGURE 8 is a cross sectional view taken on line 8—8 of FIGURE 7.

FIGURE 9 is a view, similar to FIGURE 7, showing the unit in another condition showing the receptacle contacts engaged with the terminal contacts.

FIGURE 10 is a cross sectional view taken on line 10—10 of FIGURE 5.

FIGURE 11 is an enlarged top plan view of the receptacle housing, with the receptacle removed.

FIGURE 12 is a top plan view of the receptacle and receptacle carrying member removed from FIGURE 11.

FIGURE 13 is a cross sectional view taken on line 13—13 of FIGURE 11.

Briefly, the unit consists of a cylindrical housing having a terminal block fixed in its lower or inner end and carrying a plurality of terminal contacts. A receptacle carrying unit is slidably mounted in the upper or outer end of the housing. A terminal block is mounted in the receptacle carrying unit for movement therewith, and has a plurality of plug receiving contacts complementally spaced to the terminal contacts and having portions extending inwardly through a partition rotatably mounted in the unit intermediate the inner and outer ends thereof, and these contacts are normally mis-aligned with the fixed terminal contacts. The receptacle carrying unit has yieldably locking means normally restraining the unit against rotation in the housing. When a plug having plug contacts and a skirt surrounding the plug contacts is inserted in the unit, the plug skirt moves the locking means axially inwardly to permit rotation of the receptacle carrying member. Simultaneously, contact is made between the plug contacts and the contacts mounted in the terminal block of the receptacle carrying member. Upon rotation of the plug and receptacle carrying member the contacts, which extend through the partition, are moved into alignment with the fixed terminal contacts, and at the same time the plug and receptacle carrying member are latched together. Upon further axial inward movement of the plug, the contacts extending through the partition are moved into engagement with the fixed terminal contacts so as to complete the circuit from the fixed contacts to the plug contacts.

When it is desired to disengage the plug from the receptacle, the plug is moved axially outwardly as a first step, and in this first step the contacts in the receptacle carrying member are disengaged from the fixed terminal contacts. Thereafter, the plug is rotated so as to release or unlatch the plug and receptacle carrying member latching means, and the plug is then finally withdrawn from the unit.

The partition member and the fixed terminal block are mounted in the housing in dust tight relation thereto whereby the circuit is broken in a sealed chamber so as to prevent any arc formed therein from igniting the surrounding atmosphere, and the contacts in the receptacle carrying member which are exposed have been rendered dead, or harmless, upon the first axial outward movement of the plug.

Referring now to FIGURE 3 of the drawings, the receptacle unit is made up of a cylindrical housing having an upper or outer portion 15 and a reduced inner portion 16. The reduced inner portion 16 terminates in a rectangularly shaped flange 17 which is provided with a plurality of apertures 18 (see FIGURE 2). The inner or under side 19 of the plate 17 is machined very smoothly so as to provide an explosion-proof joint with the surface, not shown, to which the unit is attached. The unit is attached to such a surface by means of threaded fasteners 95 which extend through the apertures 18 in the flange 17.

A terminal block 20, see FIGURES 2, 5, 7 and 9, is mounted in fixed relation in the inner end of the portion 16 of the housing and carries a plurality of terminal contacts 21, one of which is a neutral contact and is grounded to the housing by means of the ground strap 22 (see FIGURE 2).

The lower end of the portion 16 of the housing is formed with an inwardly extending flange 24 (see FIGURES 2 and 7) which cooperates with the retaining ring 25 which is affixed to the under side of the plate 17 by a pair of fasteners 26, in order to mount the terminal block 20 in fixed relation in the unit. The terminal block 20 is mounted in explosion-proof relation in the unit by means of the dust ring 28 and the sealing compound 29.

Referring now to FIGURE 7, a receptacle carrying member 30 is mounted in the outer portion 15 of the housing for axial and rotative movement. Carried in the receptacle carrying member is a receptacle 31 having a plurality of contacts 32 spaced complementally to the contacts 21 in the fixed terminal block 20 in the inner end of the housing. The contacts 32 are of the double end type and extend inwardly toward the fixed terminal block 20 through apertures in a partition member 34 rotatably mounted, as by threads 35, in the housing. As will be seen by referring to FIGURE 4, the contacts 32 are normally mis-aligned with the contacts 21 and terminate in spaced relation to the terminal block 20. The contacts 32 are mounted in the terminal block 31 so as to have a female or receptacle-type contact end portion 37 extending through the partition 34 and terminating adjacent the terminal block 20, and a male or plug receiving contact 38 extending into the terminal block 31.

The receptacle carrying member 30 is provided in its external surface with an L-shaped groove having an axially extending portion 40 and a circumferentially extending portion 41, shown in FIGURE 5. This L-shaped groove cooperates with a pin 42 threadedly mounted in a boss 43 formed in the outer portion 15 of the housing so as to guide the axial and rotative movement of the receptacle carrying member 30.

The block 31 is formed at its inner end with a shoulder 44 which engages the flange 45 of the carrying member. A disk 46 overlies the inner end of the block 31 and is fixed to the member 30 by screws 47 to restrain the plug 31 against movement relative to the member 30.

The member 30 is provided with a pair of slots 51 and 52 which extend axially in the side wall of the member 30. A locking ring 53, see FIGURES 3 and 12, is slidably mounted on the block 31 and is yieldably maintained in upward position by means of a coil compression spring 54 which surrounds the plug 31. Ring 53 is provided with a pair of radially extending ears 56 and 57 which extend through the slots 51 and 52, respectively.

Referring now to FIGURES 1 and 11, it will be seen that portion 15 of the housing is provided with a pair of axially extending grooves 60 and 61 formed by the raised surfaces 63 and 64 which extend axially in the side wall of portion 15 of the housing. The ears 56 and 57 extend through the slots 51, 52, of the carrying member and into the grooves 60, 61, to restrain rotation of the carrier member 30 in the housing. As best seen in FIGURE 13, the raised portions 64 extend inwardly from the outer end of the housing substantially the full length of the portion 15. The raised portions or ribs 63, however, terminate a short distance inwardly from the outer end of the housing. When there is no plug inserted in the receptacle and the ring member 53 is positioned in its up or outward position, as shown in FIGURE 3, the ears 56, 57, are positioned in the grooves 60, 61. In this position, the shorter ribs 63 prevent clockwise rotation of the carrying member and receptacle, referring to FIGURE 11, and the long ribs prevent counter-clockwise movement of the receptacle assembly and with no plug inserted in the receptacle, the pin is positioned in the circumferential portion 41 of the guiding slot formed in the outer surface of the carrying member 30.

As best seen in FIGURES 1, 5 and 6, the member 30 is provided with an annular recess 66. A pair of spring straps 67 are mounted in the recess 66 and their ends are connected to a pair of latching pins 68, for a purpose hereinafter described.

Referring to FIGURES 11 and 13, the outer portions of the ribs 64 are formed on their edges opposite to the edges defining the grooves 60, 61, with cam surfaces 70. With the receptacle carrying member shown in outward position, as in FIGURES 3, 5 and 7, the buttons 68 are positioned in the low portion of the cam surfaces 70. When a plug has been inserted in the receptacle to move the retaining ring 53 out of engagement with the rib 63 and the carrying member is rotated in a clockwise direction, FIGURE 11, the buttons 68 move up the inclined cam surfaces on to the rib 64 and, in doing so, the buttons 68 are thus cammed radially inwardly through the apertures 72 formed in the carrying member 30.

Referring to FIGURE 4, a polarizing pin 73 is mounted to extend through the wall of the member 30 adjacent to the outer end of said member. The polarizing pin 73 cooperates with a polarizing groove 74 extending axially of the plug skirt 75 of a plug 76 to properly polarize the plug 76 with respect to the receptacle unit. The plug skirt 75 surrounds plug contacts 77 carried by plug 76 and spaced complementally to the contacts 38 carried by the terminal block 31. The plug skirt 75 is formed with a pair of apertures 78 spaced circumferentially about the plug skirt complemental to the apertures 72 in the member 30 in which the latching pins 68 are mounted for radial movement, as previously described.

Mounted at the outer end of the portion 15 of the housing is a cover 80 which normally closes the exposed outer end of the housing. The cover 80 is formed with a pair of hinge eyes 81 and 82 which are aligned with an aperture 83 in the boss 85 formed on the outer end of the housing 15, whereby a hinge pin 86 may be inserted through the eye 82, boss 85 and eye 81 to hingedly mount the cover 80 on the receptacle. The aperture in the boss 85 is oversize so as to allow for the insertion of a coil spring 87 which cooperates with the pin 86 to yieldably bias the cover 80 toward a closed position in an old and well known manner.

In operation, the normal condition of the receptacle unit is that illustrated in FIGURE 3, wherein the ears 56 and 57 on the locking ring 53 are in the grooves 60 and 61 above the lower terminus of the ribs 63 to prevent rotation of the member 30. In this condition, the outer ends 38 of the contacts 32 are dead since they are not connected to the contacts 21 and further, the contacts 32 which extend through the partition 34 in the manner previously described are mis-aligned with the contacts 21.

Referring now to FIGURE 4, when the plug 76 is inserted in the unit, the plug skirt 75 moves into the annular space between the member 30 and the block 31 to engage the locking ring 53. Simultaneously, the contacts 77 are moved into engagement with the outer end contacts 38 of the double end contacts 32. As the plug is moved axially inwardly to the position shown in FIGURE 4, the skirt 75 causes the locking ring 53 to be moved axially inwardly to compress the spring 54, whereby the ears 56 and 57 are clear of the inner end of the ribs 63. At this point, the plug 42 is at the far end of the circumferential portion of the L-shaped slot.

Referring now to FIGURES 5 and 7, the plug 76 is then rotated in a clockwise direction, FIGURE 11. This rotation is translated to the member 30 through the polarizing lug 73 formed on the member 30 and the polarizing groove 74 formed in the plug skirt 75. The circumferential portion 41 of the L-shaped slot cooperates with the plug 42 to guide and limit this rotation to the point where the pin 42 is in axial alignment with the axially extending portion 40 of the L-shaped slot. Simultaneous with this action, the pins 68 have been cammed radially inwardly by the cam surfaces 70 to move the pins 68 in the apertures 72 of the member 30 into the apertures 78 in the plug skirt 75, thereby latching the plug skirt and member 30 together.

At this point, the contacts 32 have become aligned with the contacts 21 in the block 20 by reason of the rotation of the member 30, see FIGURE 7. The plug 76 is then moved further axially inwardly whereby the inner ends 37 of the contact members 32 move into engagement with the contacts 21. This final inward movement is guided and limited by the plug 42 and the axial portion 40 of the L-shaped slot. This final condition is shown in FIGURE 9 and a circuit has now been completed from the contacts 21 through the contact members 32 to the contacts 77 carried by the plug 76. As will be seen, the contact between the members 32 and members 21 takes place in a sealed chamber 90 created by the partition member 34 and the sealed terminal plug 20. As will be apparent, any arcing caused in this chamber 90 by either making or breaking the engagement between the contacts 32 and contacts 21 will be contained within the chamber 90 and cooled below the ignition point by the flame-proof paths provided by the threaded joint 35 and the smooth, close fitting, dust excluding joint between the contact members 32 and the apertures 33 through which they extend in the partition 34.

By way of example, in the embodiment of the invention shown in the drawings, the joint between the sliding contacts 32 and the apertures formed in the partition 34 must extend for a minimum length of 1" and the clearance between the contact and the aperture and the partition must not exceed thirty-three ten thousands (.0033) in order to render this joint explosion-proof. In addition, there must be a minimum of five threads in engagement at the threaded joint 35 to make this path explosion-proof.

To make the chamber 90 dust excluding, the joint between the contacts 32 and the apertures in the partition 34 must be a minimum length of ½" and have a clearance of five thousands (.005), and again the threaded joint 35 must comprise a minimum of five threads in engagement.

When the tolerances as set forth in the first example above are incorporated in the unit, it will be obvious that the unit is not only explosion-proof but that the chamber 90 is dust excluding. The standards for achieving the explosion-proof construction as well as the dust excluding construction are established by the fire underwriters and like organizations and are dependent upon the hazardous atmosphere in which the unit is intended to be used. Accordingly, these examples are given by way of illustration only and are not intended to be limiting in any sense.

It will, therefore, be apparent that I have provided by my invention an electrical connecting unit which is both dust tight and explosion-proof, and in which exposed contacts are rendered dead or harmless when the plug is disconnected from the unit.

This application is a continuation of my earlier application Serial No. 736,229, filed May 19, 1958 now abandoned.

What I claim is:

1. A dust tight, dead front, electrical connecting unit comprising a receptacle housing having fixed contacts mounted in its inner end, an open plug receiving outer end, a partition threadedly mounted in dust tight fashion for rotation in said housing intermediate said fixed contacts and said outer end, a plug receiving receptacle carrying member mounted for axial and rotative movement in the outer end of said housing, a plug having a sleeve surrounding contacts carried by said plug, a receptacle secured in said receptacle carrying member in spaced concentric relation thereto, said receptacle having plug receiving contacts complemental to said plug contacts and said fixed contacts, said plug receiving contacts extending axially inwardly and slidable through said partition and terminating in spaced axial relation from and normally misaligned with said fixed contacts, said plug receiving contacts being engagable with said fixed contacts upon rotative and inward axial movement of said receptacle carrying member, means interfitting between said housing and said receptacle carrying member to restrain said member against axial movement until said member is rotated, locking means in said unit restraining said rotative movement comprising a pair of raised internal surfaces in said housing, a groove extending from said open end axially inwardly on each of said raised surfaces, a pair of axially extending slots formed in said receptacle carrying member, a ring member positioned in the space between said receptacle and said receptacle carrying member, said ring member having a pair of ears extending through said slots into sliding engagement with said grooves, yieldable means positioned in said receptacle carrying member normally urging said ring member outward in said receptacle carrying member whereby, upon insertion of said plug, said sleeve engages said ring member to move it axially inwardly to move said ears out of said grooves to permit rotation of said receptacle carrying member, and latching means operable upon rotation of said receptacle carrying member to latch said plug against withdrawal of said plug from said receptacle carrying member until said plug receiving contacts in said receptacle carrying member are axially disengaged and spaced from said fixed contacts.

2. A dust tight, dead front, electrical connecting unit comprising a receptacle housing having fixed contacts mounted in its inner end, an open plug receiving outer end, a partition threadedly mounted in dust tight fashion for rotation in said housing intermediate said fixed contacts and said outer end, a plug receiving receptacle carrying member mounted for axial and rotative movement in the outer end of said housing, a plug having a sleeve surrounding contacts carried by said plug, a receptacle secured in said receptacle carrying member in spaced concentric relation thereto, said receptacle having plug receiving contacts complemental to said plug contacts and said fixed contacts, said plug receiving contacts extending axially inwardly and slidable through said partition and terminating in spaced axial relation from and normally misaligned with said fixed contacts, said plug receiving contacts being engageable with said fixed contacts upon rotative and inward axial movement of said receptacle carrying member, means interfitting between said housing and said receptacle carrying member to restrain said member against axial movement until said member is rotated, locking means movable into and out of locking position, said locking means being operable in locking position to lock said receptacle carrying member against rotation, said locking means being movable out of locking position upon insertion of said plug in said plug receiving receptacle carrying member, and latching means comprising a pair of pins mounted for radial movement on the exterior of said receptacle carrying member, a pair of internal cam surfaces formed in said housing, said pins communicating with a pair of apertures formed in said receptacle carrying member, yieldable means normally urging said pins radially outward in said apertures into engagement with said housing, a pair of apertures in said plug sleeve positioned in circumferentially complemental relation to the apertures in said receptacle carrying member whereby, upon insertion and rotation of said plug in said plug receiving receptacle carrying member, said pins are cammed into the apertures in said plug sleeve, thereby releasably latching said plug and receptacle carrying member together.

3. A dust tight, dead front, electrical connecting unit comprising a receptacle housing having fixed contacts mounted in its inner end, an open plug receiving outer end, a partition mounted for rotation in said housing intermediate said fixed contacts and said outer end, a plug receiving receptacle carrying member mounted for axial and rotative movement in the outer end of said housing, a plug having a sleve surrounding contacts carried by said plug, a receptacle secured in said receptacle carrying member in spaced concentric relation thereto, said receptacle having plug receiving contacts complemental to said plug contacts and said fixed contacts, said plug receiving contacts extending axially inwardly and slidable through said partition and terminating in spaced axial relation from and normally misaligned with said fixed contacts, said plug receiving contacts being engageable with said fixed contacts upon rotative and inward axial movement of said receptacle carrying member, means interfitting between said housing and said receptacle carrying member to restrain said member against axial movement until said member is rotated, locking means in said unit restraining said rotative movement comprising a pair of raised internal surfaces in said housing, a pair of axial grooves extending from said open end inwardly on said raised surfaces, a pair of axially extending slots formed in said receptacle carrying member, a ring member positioned in the space between said receptacle and said receptacle carrying member, said ring member having a pair of ears extending though said slots into sliding engagement with said grooves, yieldable means positioned in said receptacle carrying member normally urging said ring member outward in said receptacle carrying member whereby, upon insertion of said plug, said sleeve engages said ring member to move it axially inwardly to move said ears out of said groove to permit rotation of said receptacle carrying member, and latching means comprising a pair of pins mounted for radial movement on the exterior of said receptacle carrying member, a pair of internal cam surfaces formed in said housing, said pins communicating with a pair of apertures formed in said receptacle carrying member, yieldable means normally urging said pins radially outward in said apertures into engagement with said housing, a pair of apertures in said plug sleeve positioned in circumferentially complemental relation to the apertures in said receptacle carrying member whereby, upon insertion and rotation of said plug in said plug receiving receptacle carrying member, said pins are cammed into the apertures in said plug sleeve thereby releasably latching said plug and receptacle carrying member together.

4. In combination, a dust tight, dead front electrical connecting unit, a plug having a plurality of plug contacts received in said unit, said unit including a receptacle housing having fixed contacts passing through a closed end of said housing and insulated therefrom, a partition mounted in substantially axially fixed position and in a dust tight manner intermediate the ends of said housing, said partition and closed end of said housing forming a dust tight arcing compartment, said fixed contacts being received in said compartment, a receptacle carrying member having a receptacle, said member mounted in sliding fashion adjacent an open end of said housing, said plug being received in said receptacle, a plurality of receptacle contacts carried in said receptacle and engaged by said plug contacts, said receptacle contacts extending through said partition into said compartment and being engaged by said fixed contacts extending through said partition and, said receptacle contacts having a sliding, close fitting, and dust excluding joint with said partition and means cooperable between said housing and said receptacle carrying member being operable upon removal of said plug from said unit to first separate said receptacle contacts from said fixed contacts and thereafter separate said plug contacts from said receptacle contacts.

5. The combination plug and electrical connecting unit of claim 4, wherein said partition is rotatably mounted in said housing and wherein said last mentioned means cooperable between said receptacle carrying member and said housing is operable upon removal of said plug to effect a partial rotation of said receptacle carrying member after said fixed and receptacle contacts have been separated whereby said receptacle contacts are normally misaligned with said fixed contacts and said receptacle carrying member is normally maintained in said partially rotated position adjacent the outer open end of said housing.

References Cited in the file of this patent
UNITED STATES PATENTS

| | | |
|---|---|---|
| 1,995,195 | Tornblom | Mar. 19, 1935 |
| 2,806,213 | Petree | Sept. 10, 1957 |

FOREIGN PATENTS

| | | |
|---|---|---|
| 685,374 | France | Mar. 31, 1930 |

UNITED STATES PATENT OFFICE
CERTIFICATE OF CORRECTION

Patent No. 3,078,435                 February 19, 1963

Richard C. Berry

It is hereby certified that error appears in the above numbered patent requiring correction and that the said Letters Patent should read as corrected below.

Column 8, lines 5 and 6, strike out "extending through said partition and"; same column, line 6, after "contacts" insert -- extending through said partition and --.

Signed and sealed this 17th day of September 1963.

(SEAL)
Attest:

ERNEST W. SWIDER
Attesting Officer

DAVID L. LADD
Commissioner of Patents